United States Patent [19]

Takenouchi et al.

[11] 4,224,510
[45] Sep. 23, 1980

[54] ORIGINAL DOCUMENT READING APPARATUS

[75] Inventors: Mutsuo Takenouchi; Takashi Ozawa, both of Ebina, Japan

[73] Assignee: Fuji Xerox Co., Ltd., Tokyo, Japan

[21] Appl. No.: 946,300

[22] Filed: Sep. 27, 1978

[30] Foreign Application Priority Data

Sep. 29, 1977 [JP] Japan ................................ 52-116044

[51] Int. Cl.² ............................................ H01J 39/12
[52] U.S. Cl. .................................... 250/207; 250/578; 313/103 CM
[58] Field of Search ............ 250/213 R, 213 VT, 207, 250/578, 566; 313/103 R, 103 CM, 105 R, 105 CM; 357/31, 32

[56] References Cited

U.S. PATENT DOCUMENTS 3,887,810  6/1975  Skaggs ........................... 250/213 VT
4,119,852 10/1978  Rougeot ........................ 313/103 CM

*Primary Examiner*—David C. Nelms

*Attorney, Agent, or Firm*—Sughrue, Rothwell, Mion, Zinn and Macpeak

[57] ABSTRACT

An original document reading apparatus has a photocathode on which an image of an original document is focused. An array of secondary electron multipliers are arranged for multiplying the photoelectrons emitted from the photocathode. A plurality of anodes face the secondary electron multipliers, and capacitors are connected between the respective anodes and ground. A common load resistor is connected to the respective anodes through series circuits each including two electronic switch arrays. A scanning circuit is used for opening and closing the series connected switches to sequentially connect the common load resistor to the anodes to scan them. An amplifier circuit is used for amplifying the output which is generated in the common load resistor. The first of the electronic switch arrays are separated into n groups so that control is effected for every group and the drain terminals of the corresponding first described switches in the groups are commonly connected to the source terminals of the second electronic switch array thereby reducing the required number of the electronic switches.

10 Claims, 4 Drawing Figures

4,224,510

ORIGINAL DOCUMENT READING APPARATUS

BACKGROUND OF THE INVENTION

1. Field of the Invention

The invention relates to original document reading devices having an array of secondary electron multipliers. The invention is more particularly concerned with an inexpensive and relatively simple original document reading apparatus utilizing an optical-electric signal converter comprising a photocathode, an array of secondary electron multipliers, and anodes arranged in the vicinity of and in line with the respective secondary electron multiplier output sides for converting a one-dimensional optical image focused on the photocathod into a series of electric signals. The secondary electron multipliers in the array each has a size corresponding to the size of the unit of the optical image to be read. The anodes for each are connected through a wire lead to the source electrode of a field effect semiconductor (FES) switch so as to take signals from its drain electrode by the ON and OFF operation of its gate electrode to determine the position to be read.

2. Prior Art

Various kinds of devices have been proposed to read an original document or particularly to convert an optical image into a series of electric signals. These include image pickup tube, solid state image senser, and a combination of a photomultiplier and a laser scanning device. Such devices may conceivably be miniaturized for utilization as an original document reading apparatus, but this will generally result in a very expensive system and be difficult to bring to commercial practice.

SUMMARY OF THE INVENTION

Therefore, the present invention has a primary object to provide an original document reading apparatus capable of converting the information on an original document into a series of electric signals with high resolution and at high speed.

Another object of the present invention is to provide a simple and inexpensive original document reading apparatus using electronic switches or field effect semiconductor switches to simplify the scanning circuit. These and other objects of this invention are realized by an electronic document reading apparatus having a photocathode on which an image of the original document is focussed. An array of secondary electron multipliers are arranged for multiplying the photoelectrons emitted from the cathode. A plurality of anodes are arranged to face the multipliers and are coupled to a series of grounded capacitors. A common load resistor is connected to the respective anodes through series circuits each including two switch arrays. A scanning circuit is employed for opening and closing the series connected switches to sequentially connect the common load resistor to the anodes so as to scan those elements. An amplifier circuit amplifies the output of the load resistor. The first of the switch array groups are arranged into groups so that control is obtained for every group and the drain terminals of the corresponding switches are commonly connected to the source terminals of the second array of switches.

Reference will now be made to the accompanying drawings which illustrate schematically one preferred embodiment of an original document reading apparatus according to the present invention.

DETAILED DESCRIPTION OF THE PREFERRED EMBODIMENTS

Figure 1:
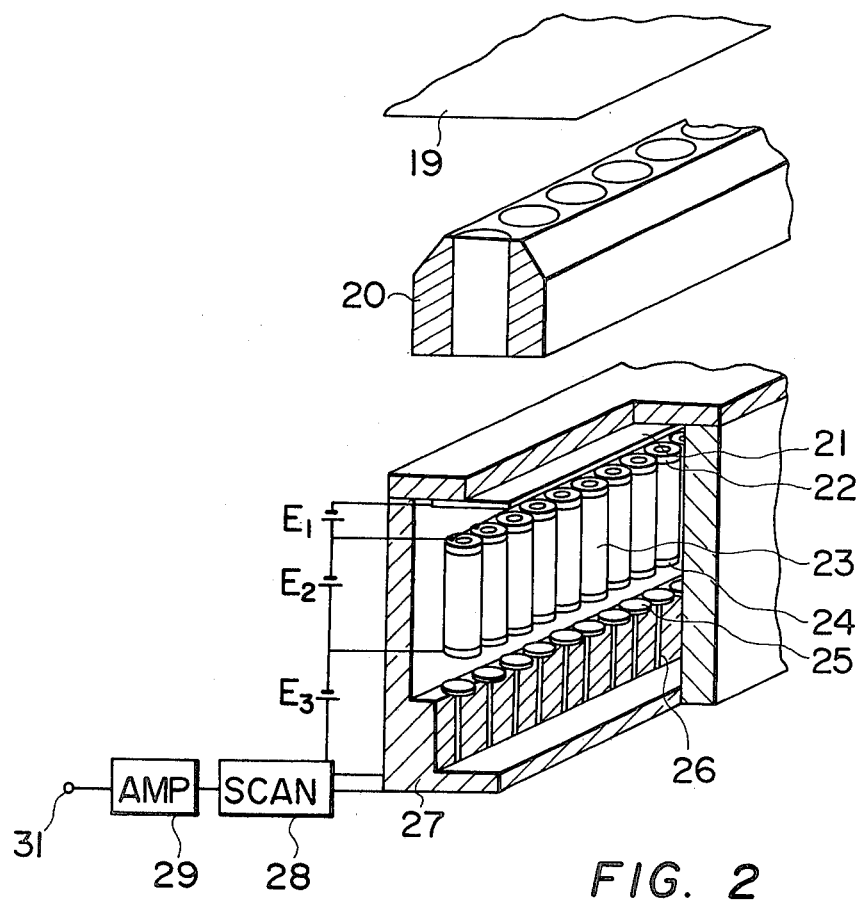
FIG. 1 is a perspective view in section showing one embodiment according to the present invention.

Referring now to FIG. 1, numeral 19 designates an original document to be read, numeral 20 a projection optical lens for focusing the original document 19 onto a photocathode 21, and numeral 23 an array of secondary electron multipliers. Each of the multipliers has at its opposite sides electrodes 22 and 24 for multiplying the photoelectrons emitted from the photocathode 21. Anodes 25 are each placed in the vicinity of and in line with the output electrode 24 of the secondary electron multiplier 23. Wire leads 26 are attached to the anodes and the entire unit is housed in a vacuum chamber 27 containing the photocathode 21, the secondary electron multiplier array 23, and the anodes 25. As shown in FIG. 1, a scanning circuit 28 (as will be described in detail) a signal amplifier circuit 29 and signal output terminal 31 are provided to process signals. Also shown are the power supplies E1 and E3.

Figure 2:
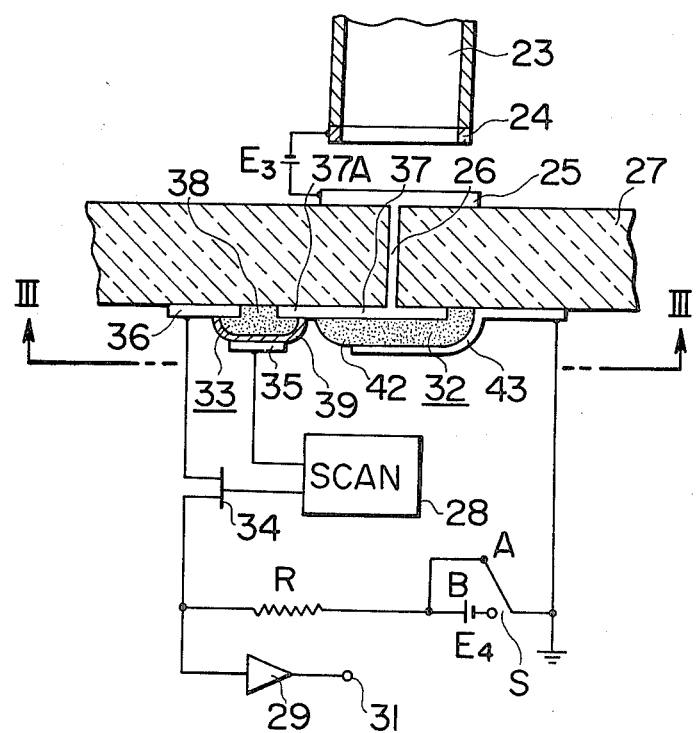
FIG. 2 is an enlarged detailed sectional view of the apparatus of FIG. 1.
Figure 3:
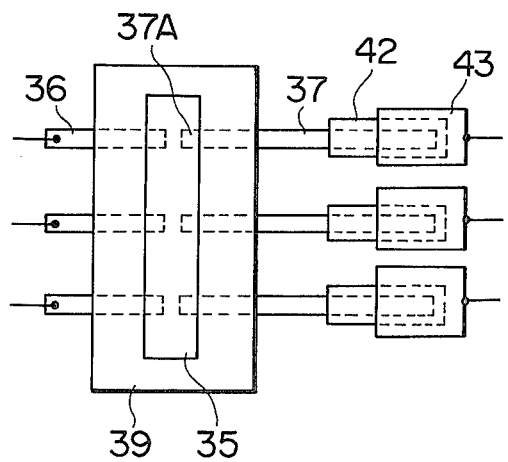
FIG. 3 is a bottom view as viewed in the direction of the arrows III—III.

FIG. 2 shows an enlarged detailed sectional view of the original document reading apparatus of the present invention with a capacitor 32 disposed between the anode 25 and ground. An FES switch 33 has one end connected to the anode 25 and the other end connected to one terminal of a FET switch 34. A common gate electrode 35 for the FES switches is shown attached to the insulator 39. The capacitor 32 may be composed of a dielectric substance 42 sandwiched between a capacitor electrode 37 disposed on the outer wall of the chamber 27 in contact with the wire lead 26 and the opposite electrode 43. The FES switch 33 has a laminated structure comprising a source electrode 37A utilizing one end of the capacitor electrode 37 and a drain electrode 36 facing the source electrode 37A. A field effect semiconductor 38 covers electrodes 36 and 37A, insulator 39, a gate electrode 35.

The photocathode 21 may be formed of a material chosen from Sb-Cs, Ag-O-Cs, Ag-B-O-Cs, or the like, The secondary electron multiplier 23 is given a proper ratio of its inner diameter to its length ranging from 1/40 to 1/60 and made of a PbO glass tube having its inner surface subject to hydrogen reduction to form thereon an N type semiconductor film or is made of barium titanate or stannous oxide semiconductor porcelain. The anodes 25 are arranged so that each anode faces each secondary electron multiplier to provide a maximum resolution or alternately may be arranged so that one anode faces a plurality of secondary electron multiplier elements.

The power supply E1 has a range of 200 to 300 volts and the power supply E2 has a range of 1 to 2 kilovolts. The field effect semiconductor 38 may be formed of zinic oxide, cadmium sulfide, zinic sulfide, or cadmium selenide. The distance between the source electrode 37A and the drain electrode 36 is in the range of several microns to 20 microns. The semiconductor layer 38 has a thickness of several microns and the insulator layer 39 has its thickness of about 1 micron. While these ranges and values are preferable, it is apparent that variations are possible without departing from the preferred structural orientation should in FIG. 2.

When the optical image on the original document 19 is projected on the photocathod 21, the photoelectrons emitted therefrom are multiplied to about $10^3$ times and reach the anode 25. Since the electrode 43 of the storage capacitor 32 connected to the anode 25 is held at ground, a positive charge will be stored in the storage capacitor 32. The stored change will be equal to the charge flowing into the anode 25. The storage capacitor 32, constitutes a closed loop with the electrodes 37, the source electrode 37A, the drain electrode 36, the FET switch 34, a load resistor R, a contact A, and the electrode 43.

The capacitor 32 is discharged to cause an input to the signal amplifier circuit 29 through the load resistor R. As shown in FIG. 2, an electrical output corresponding to the quantity of the light illuminated on the photocathode 21, will be transmitted only when both the FES switch 33 and the FET switch 34 have their gate electrodes turned ON, thereby closing the switches. Hence, a series of electric signals corresponding to the optical image can be obtained by sequentially closing the closed loops including the capacitors connected to the respective anodes through the scanning circuit 28. When the changeover switch S is turned to the contact B (see FIG. 2), the storage capacitor is initially charged through the power supply E4 and then the charge therein is neutralized by the anode current during exposure to the optical image. Thus, signal reading is accomplished by the current from the power source E4 when both of the switches 33 and 34 turned ON. This permits an integration of the signals created by the optical image to increase the sensitivity and also to reduce any noise tending to be produced during high speed reading. This will also tend to improve the S/N ratio.

Figure 4:
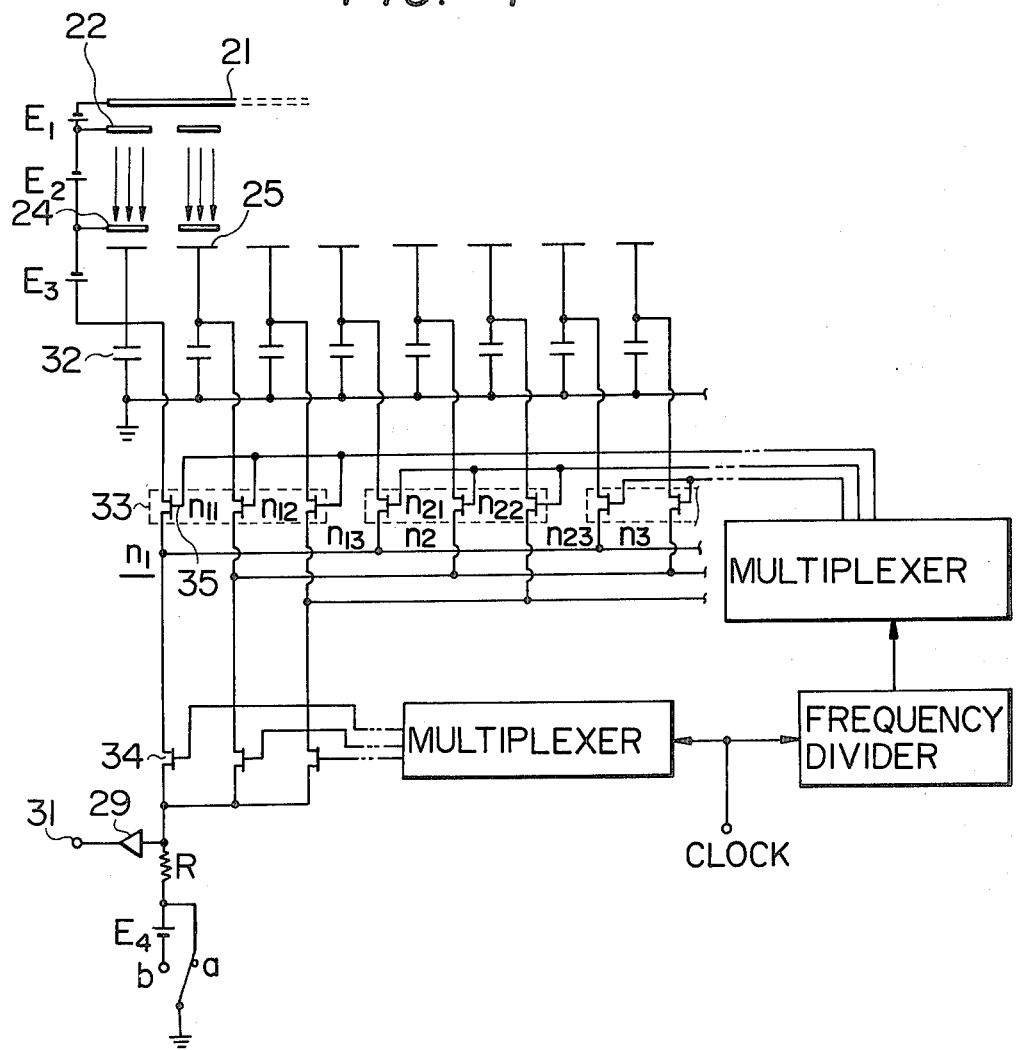
FIG. 4 is a block diagram showing one example of a scanning circuit incorporated in the apparatus of the present invention.

FIG. 4 illustrates an example of the scanning circuit 28 which includes n group of m FES switches. The gate electrodes of the m FES switches in a group are commonly connected so that the FES switches can be sequentially turned ON by a clock. The drain electrodes of the corresponding FES switches are connected commonly to one FET switch 34 so that the FES switches can be sequentially turned ON by the clock. The control of the switches are accomplished in a manner well known in fascimile receivers such as by multistylus scanning. This permits scanning a far less number of switches in comparison with the case where one independent switch is provided for every capacitor.

As described above, the original document reading apparatus of the present invention can convert a one-dimentional optical image into a series of electric signals and thus it is necessary in actual practice, of course, to move the reading apparatus relative to the original document in order to read the original document. The photocathode 21 is required to have, in the scanning direction, its length longer than the width of the original document and, in the direction normal to the scanning direction, its width determined by the resolution required.

FES switches are equivalent in function to FET switches and thus any type of FES switches may be used to attain the same effect. Widely used copier photosensitive materials, such as semiconductors typified by zinc oxide can be formed in a thin layer form simply by vacuum evaporation or spraying a mixture thereof with a resin bonding agent. It is however preferable to cover the long array as used in the present invention in comparison with monocrystal silicone FETs. The insulator layer 39 overlying the semiconductor layer 38 is necessary to prevent the signal charge from the source electrode 37A from flowing into the gate electrode 35.

The original document reading apparatus of the present invention includes a cellfox lens used as the projection optical lens and a simple scanning circuit is employed which results in relatively simple and inexpensive apparatus.

The present invention will be more clearly understood with reference to the following Example. The lens used in the original document projection optical system is a cellfox lens which has 40 glass fibers having a diameter of 0.9 mm arranged in a zigzag fashion with a 80 mm optical length. In the position in which the optical image of the original document is focused the band-shaped photocathode 21 formed of Sb-Cs having a thickness of 0.1 mm and a width of 20 mm is disposed. A second electron multiplier array 23 composed of 160 pipes has inner diameter of 80 $\mu$m and a length of 1 mm arranged in a 125 $\mu$m pitch is provided such that input side open ends are positioned 0.3 mm below the photocathode 21.

Each of the pipes is provided at its opposite open ends with a chrome electrode. The input side electrode 22 is maintained at $-1$ volt and the output side electrode 24 at $+0$ volt. The secondary electron multiplier pipe is made of a PbO glass pipe having an inner surface subject to hydrogen reproduction for the formation of a N type semiconductor and has a resistance of $6 \times 10^{11}$ ohms. An array of 80 $\mu$m diameter pin electrodes are arranged near the output open ends in a line and in a 125 $\mu$m pitch. The pin electrodes are electrically insulated from each other and have their other ends connected through wire leads 26 (FIG. 2) extending through the vacuum chamber wall 27.

The outer face of the vacuum chamber wall 27 is polished and storage capacitors 32 and FES switches 33 are formed thereon. The formation of the capacitor electrodes 32 and the FES switches 33 is accomplished by masking gold about $1000^{-°}$ A in thickness through an evaporation mask. This provides 1 $\mu$m SiO2 films of 1 $\mu$m on the portions at which the capacitors 32 are to be formed and provides 2 $\mu$m CdS semiconductors 38 and 1 $\mu$m SiO2 films 39 on the portions at which the FES switches are to be formed simultaneously metal electrodes 43 and 32 are formed by masking to form evaporation films. The drain electrodes and the gate electrodes are wired as shown in FIG. 4. The FET switches 34 are typically of the type 2N4393 made by National Semicon Corp. and 1 kilo ohm load resistors and a 10 volt power supply are also employed. The illumination of the original document is accomplished by a 20 KHz high frequency fluorescent lamp.

When video signals of the original document arranged as described above were used as an input to a storage type oscilloscope, an image coinciding with the original pattern was obtained.

It is apparent that various modifications and changes may be made to this invention without departing from its essential scope and features.

We claim:

1. A document reading apparatus comprising: a photocathode having an image of the document focused thereon and emitting photoelectrons therefrom, an array of secondary electron multipliers for multiplying photoelectrons emitted from said photocathode, a plurality of anodes facing said secondary electron multipliers, capacitor means connected between said anodes and ground, first and second series circuits including switch means associated therewith, each of said switch means having source and drain terminals, load resistor means selectively coupled to the anodes through said series circuits, scanning circuit means coupled to said switch means for selectively opening and closing said switches whereby said load resistor means is sequentially coupled to said anodes, said first switch means separated into n groups each containing m switches wherein control is effectuated for each group and wherein the drain terminals of corresponding m switches in each group said first array of switch means are commonly connected to the source terminals of said second array of switch means, and means for amplifying the output of said load resistor.

2. The system of claim 1 further comprising means to focus the image of said document onto said photocathode.

3. The system of claim 1 wherein each the switch means of said first series circuit comprises a non-silicon field effect semiconductor disposed between a source and drain pair and a gate electrode.

4. The system of claim 3 wherein each of said switch means of said first of said series circuits have a common nonsilicon field effect semiconductor and a common gate electrode.

5. The system of claim 1 further comprising a vacuum chamber housing said electron multipliers and said anodes.

6. The system of claim 5 further comprising leads disposed in a wall of said vacuum chamber coupling said anodes to said capacitor means.

7. The system of claim 6 wherein said anodes are mounted on an inner wall surface of said vacuum chamber and said capacitor means are formed on an outer surface of said chamber.

8. The system of claim 7 wherein one electrode of said capacitor means also defines a source terminal for the switch means of said first series circuit.

9. The system of claim 8 wherein each of said switch means of said first of said series circuits have a common non-silicon field effect semiconductor and a common gate electrode.

10. The system of claim 9 wherein each of the switch means of said first series circuit comprises a non-silicon field effect semiconductor disposed between a source and drain pair and a gate electrode.

* * * * *